April 25, 1967  J. J. RILEY ET AL  3,316,430
DIRECT CURRENT DYNAMOELECTRIC MACHINE
Filed Nov. 6, 1963

3,316,430
DIRECT CURRENT DYNAMOELECTRIC
MACHINE
John J. Riley, Lockport, N.Y., John W. Erickson, Los Angeles, Calif., and William R. Harding, Blacksburg, Va., assignors to Westinghouse Electric Corporation, East Pittsburgh, Pa., a corporation of Pennsylvania
Filed Nov. 6, 1963, Ser. No. 321,833
2 Claims. (Cl. 310—204)

This invention relates, generally, to armature windings and, more particularly, to armature windings for use on high speed, high power direct current machines where commutation is a major problem.

The maximum safe peripheral speed determines the armature diameter of a dynamoelectric machine which operates at a given speed. The maximum current rating for a given armature diameter is determined by the number of parallel circuits and the number of commutator bars. This is given by the following formula:

$$\frac{\text{bars} \times \text{turns} \times \text{amps}}{\text{circuits} \times \text{arm. diam.} \times \pi} < 500$$

The minimum number of bars for 550 volts is approximately 120. The accepted limit for flashing voltage is determined by the formula:

$$\frac{\text{volts} \times \text{poles}}{\text{bars}} < 20$$

Past engineering experience has shown that where the number of parallel circuits is more than the number of poles, trouble is experienced in getting the current to divide equally between the parallel windings and in properly locating the equalizer connections.

Accordingly, an object of the invention is to increase the power rating of a dynamoelectric machine actually having the same number of parallel circuits as the number of poles by obtaining the equivalent in regard to volts per bar and circuits of a machine with the number of parallel circuits double the number of poles.

Prior machines having two coil sides in each core slot have had poor commutation. The reactance voltage of the top coil side during commutation is only one-fourth of that of the bottom coil side. Since both a top coil side and a bottom coil side are connected to a commutator bar, the commutating pole strength must be adjusted to the average value of the top and bottom coil sides. Due to the wide difference in the reactance volts induced on the top and bottom coil sides during commutation, no strength of commutating pole will give good commutation.

Therefore, another object of the invention is to improve the commutation of a machine having a given commutating pole strength.

Other objects of the invention will be explained fully hereinafter or will be apparent to those skilled in the art.

In accordance with one embodiment of the invention, a conductor extends from a tap at the midpoint of each armature coil of a machine to a commutator bar located between the two bars to which the ends of the coil are attached. The tap conductors are disposed in slots in the outer periphery of the armature shaft underneath the armature core laminations, and two conductors are so arranged in each shaft slot that current flows in opposite directions in the conductors, thereby balancing the inductances due to current flowing in the tap conductors. Also, each main armature coil is inverted half-way through the core length and on each coil side so that half of each coil side is in the bottom of a core slot and half is in the top of a slot, there being two coil sides in each slot. In this manner the reactance voltage during commutation is the same on top and bottom coil sides, thereby securing good commutation.

For a better understanding of the nature and objects of the invention, reference may be had to the following detailed description, taken in conjunction with the accompanying drawings, in which.

Figure 1:
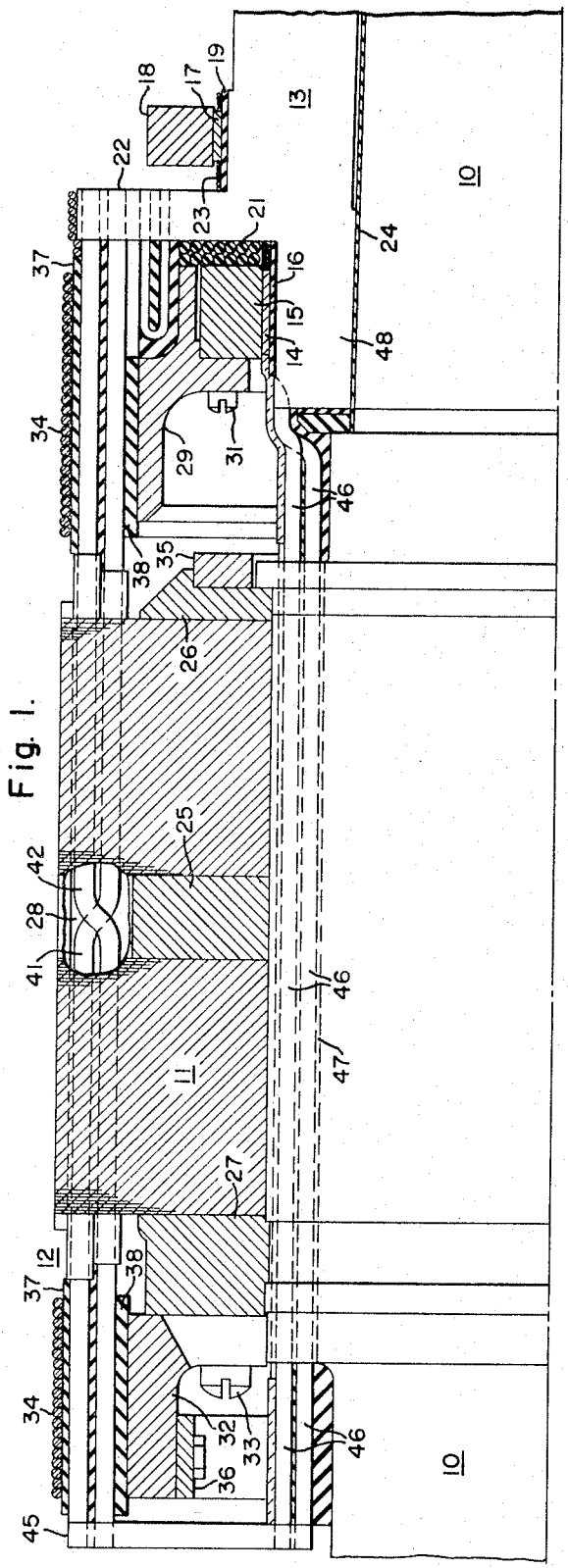
FIGURE 1 is a view, partly in longitudinal section and partly in elevation, of a portion of an armature assembly for a dynamoelectric machine embodying principal features of the invention.

Referring to the drawings, and particularly to FIG. 1, the structure shown therein comprises generally a portion of a rotatable shaft 10, a laminated armature core 11, a plurality of armature coils 12 and a plurality of commutator bars 13. The shaft 10 may be rotatably mounted in suitable bearings (not shown) supported by a stator frame (not shown). As shown, the front end of the shaft is tapered slightly to receive the commutator bars 13 which are retained in a cylindrical formation by a plurality of pairs of shrink rings, only two pairs of which are shown. One pair includes an inner ring 14 and an outer ring 15. The inner ring 14 is insulated from the commutator bars 13 by insulation 16. The other pair shown includes an inner ring 17 and an outer ring 18. Insulation 19 is disposed between the inner ring 17 and the bars 13. Additional shrink rings similar to the rings 17 and 18 may be spaced along the commutator bars. Additional insulation in the form of asbestos packing 21 is provided between the shrink ring 15 and the commutator risers 22. Also, glass banding 23 may be provided around the insulation 19. Insulation 24 is provided between the bars 13 and the shaft 10. Other types of commutator construction may also be used if desired.

The armature core 11 comprises two sections of laminations having a spacer 25 between them. The laminations may be assembled on the shaft 10 between a front end plate 26 and a rear end plate 27 spaced on the shaft 10. Longitudinal slots 28 are provided around the outer periphery of the core 11 for receiving the armature coils 12. The front ends of the coils are supported by a front support 29 attached to the shrink ring 15 by cap screws 31. The rear ends of the coils are supported by a rear support 32 attached to the rear end plate 27 by cap screws 33.

In accordance with the usual practice, the ends of the armature coils are banded with suitable bands 34. Balance rings 35 and 36 may be attached to the front end plate 26 and the rear support 32, respectively. Suitable insulation 37 may be provided between coils 12 and the bands 34 if necessary. Likewise, insulation 38 is provided between the coils and the front and the rear supports 29 and 32, respectively.

Figure 3:
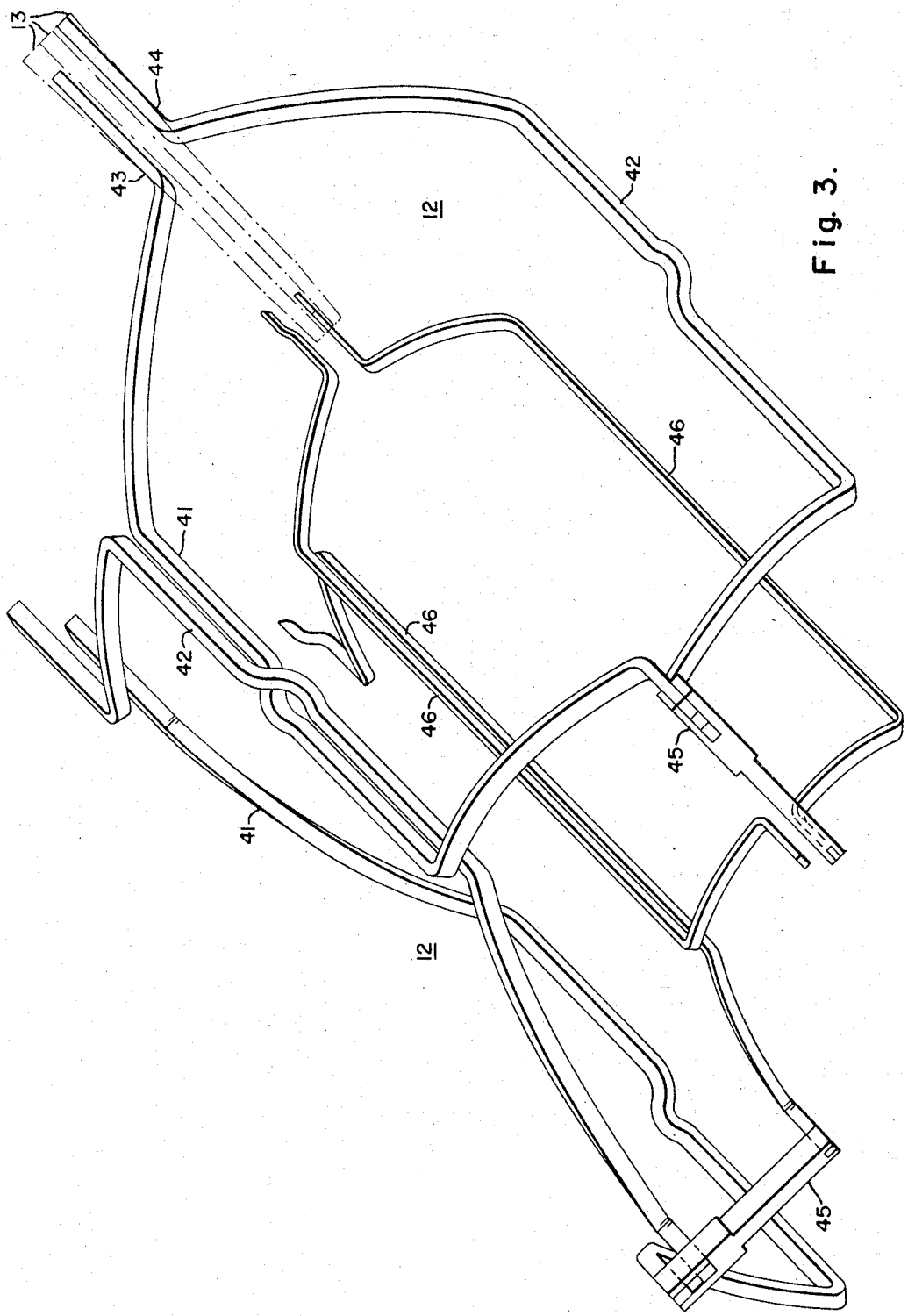
FIG. 3 is an isometric view of armature coils and tap conductors for the machine.

As shown most clearly in FIG. 3, each coil 12 comprises two coil sides 41 and 42 having ends 43 and 44, respectively, connected to alternate commutator bars 13. A side 41 of one coil and a side 42 of another coil are disposed in the same slot 28 in the armature core 11 as shown in FIG. 1.

In order to more evenly balance the inductance due to current in each coil, the coil sides are crossed or inverted from the top of a slot to the bottom of the slot substantially half-way through the core length. Thus, half of each coil side is at the top of a slot and half is at the bottom of a slot. If the coil sides were not inverted there would be a wide difference in the reactance voltage induced during commutation on the top and bottom coil sides, thereby causing poor commutation. With the sides of the coil inverted at the center of the core, the reactance voltage during commutation is substantially the same on top and bottom coil sides, thereby securing good commutation since the currents flowing in the commutator bars are substantially balanced.

In order to reduce the voltage per bar on the commutator, a tap connector 45 on the midpoint at the rear end of each coil is connected by a conductor 46 to a commutator bar located between the two bars to which the front ends of the coil are connected. The tap conductors 46 are disposed in longitudinal slots 47 spaced around the periphery of the shaft 10. Two conductors 46 are disposed in each shaft slot 47. The rear ends of the two sides of each coil are joined by the tap connector 45 which is attached to one end of a conductor 46. The other end of the conductor 46 is connected to an extension 48 of a commutator bar 13 as shown in FIG. 1. It will be understood that the tap conductors 46 are placed in the shaft slots 47 before the armature core is assembled on the shaft.

Figure 2:
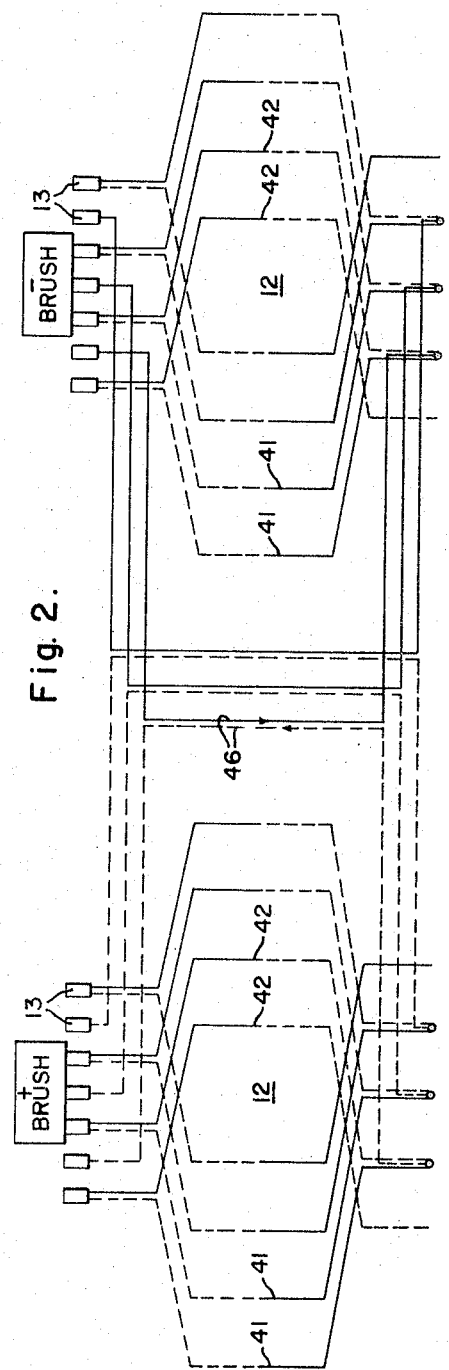
FIG. 2 is a diagrammatic view showing armature coil connections for the machine.

As shown in FIG. 2, the tap conductors 46 are so arranged that current flows in one direction in one conductor in a slot 47 and in the opposite direction in the other conductor in the same slot. Thus, the inductance due to current flowing in one tap conductor tends to balance the inductance due to current flowing in the other tap conductor in the same slot. The tap conductors may be made of a cross-sectional area smaller than the area of the main armature coils since current flows in each tap conductor only part of the time.

As explained hereinbefore, the current rating for a given armature diameter is determined by the number of parallel circuits and the number of commutator bars. By connecting the midpoint of each armature coil to a commutator bar located between the two bars to which the ends of the coil are connected in the manner herein described, the equivalent in regard to volts per bar and circuits of a machine with a number of parallel circuits double the number of poles is obtained.

Thus, in one particular embodiment of the invention in a machine having 4 poles, 132 commutator bars, and 4 circuits, the machine had 66 core slots, one turn per coil, and 33 shaft slots for the tap conductors. If the extra bar and tap at the midpoint of each coil had not been provided, the machine would have been limited to 300 volts, but with the present arrangement it could be rated 550 volts, with corresponding increase in output and with excellent commutation.

From the foregoing description it is apparent that the invention provides an armature winding suitable for a high speed, high power D.C. machine where commutation is a major problem. The voltage and hence the power rating of a machine can be approximately doubled by utilizing the present invention.

Since numerous changes may be made in the above-described construction and different embodiments of the invention may be made without departing from the spirit and scope of the invention, it is intended that all subject matter contained in the foregoing description or shown in the accompanying drawings shall be interpreted as illustrative and not in a limiting sense.

We claim as our invention:

1. In a dynamoelectric machine, an armature member having a shaft, an armature core disposed on the shaft and having generally longitudinal peripheral slots, a commutator on the shaft adjacent the armature core, a plurality of armature coils disposed in said slots, each coil having one coil side lying in a slot and connected to a bar of said commutator and having another coil side lying in a different slot and connected to a commutator bar spaced from the first-mentioned bar by one intervening bar, and a tap conductor extending between the intervening commutator bar and the midpoint of the coil at the end of the armature core opposite to the commutator, said shaft having slots therein and said tap conductors being disposed in the slots of the shaft, each shaft slot containing two tap conductors connected so that they carry currents flowing in opposite directions.

2. In a dynamoelectric machine, an armature member having a shaft, an armature core disposed on the shaft and having generally longitudinal peripheral slots, a commutator on the shaft adjacent the armature core, a plurality of armature coils disposed in said slots, each coil having one coil side lying in a slot and connected to a bar of said commutator and having another coil side lying in a different slot and connected to a commutator bar spaced from the first-mentioned bar by one intervening bar, and a tap conductor extending between the intervening commutator bar and the midpoint of the coil at the end of the armature core opposite to the commutator, said tap conductors being disposed in longitudinal slots in the shaft, each slot of the shaft containing two tap conductors connected so that they carry currents flowing in opposite directions, each of the slots of the armature core containing coil sides of two different coils arranged one above the other in the slot, and the relative positions of the two coil sides in each armature slot being inverted adjacent the center of the armature core.

References Cited by the Examiner

UNITED STATES PATENTS

| | | | |
|---|---|---|---|
| 1,144,252 | 6/1915 | Roebel | 310—213 |
| 1,430,862 | 10/1922 | Taylor et al. | 310—213 |
| 1,568,692 | 1/1926 | Pollock | 310—203 |
| 2,371,962 | 3/1945 | Lane | 310—205 X |
| 2,632,125 | 3/1953 | Baldwin | 310—204 |

FOREIGN PATENTS

| | | |
|---|---|---|
| 618,804 | 9/1935 | Germany. |
| 431,617 | 7/1935 | Great Britain. |
| 769,043 | 2/1957 | Great Britain. |

MILTON O. HIRSHFIELD, *Primary Examiner.*

MAX L. LEVY, *Examiner.*

J. J. SWARTZ, *Assistant Examiner.*